United States Patent [19]

Kenyon et al.

[11] 4,450,531
[45] May 22, 1984

[54] BROADCAST SIGNAL RECOGNITION SYSTEM AND METHOD

[75] Inventors: Stephen C. Kenyon, Stafford, Va.; Laura J. Simkins, Clarksburg, Md.; Leroy L. Brown, Springfield; Richard Sebastian, Lorton, both of Va.

[73] Assignee: Ensco, Inc., Springfield, Va.

[21] Appl. No.: 416,664

[22] Filed: Sep. 10, 1982

[51] Int. Cl.³ ............................ G06J 1/00; H04B 1/00
[52] U.S. Cl. ...................................... 364/604; 358/84; 364/728; 381/42; 455/2
[58] Field of Search ............... 364/604, 728, 819, 820; 455/2, 67, 39; 358/84, 117; 179/1 SB, 84 VF; 382/42; 340/146.2; 369/48, 53, 54, 58; 381/42

[56] References Cited

U.S. PATENT DOCUMENTS

| | | | |
|---|---|---|---|
| 3,182,135 | 5/1965 | Siezen | 324/210 X |
| 3,546,440 | 12/1970 | Fawcett, Jr. | 364/604 |
| 3,609,684 | 9/1971 | Lipp | 364/819 X |
| 3,919,479 | 11/1975 | Moon et al. | 179/1 SB |
| 4,025,851 | 5/1977 | Haselwood et al. | 455/2 |
| 4,230,990 | 10/1980 | Lert, Jr. et al. | 455/2 X |
| 4,297,528 | 10/1981 | Beno | 179/1 SB |

Primary Examiner—Joseph F. Ruggiero
Attorney, Agent, or Firm—Sixbey, Friedman & Leedom

[57] ABSTRACT

The method for the automatic electronic recognition of a program unit broadcast by radio waves includes the formation of a plurality of reference signal segments from the program unit and the processing of such segments to obtain digitized reference signal segments which are then normalized and stored. When the program unit is broadcast, the broadcast signal is processed to generate successive digitized broadcast signal segments which are correlated with the digitized, normalized reference signal segments to obtain correlation function peaks for each resultant correlation segment. The spacing between the correlation function peaks for each correlation segment is then compared to determine whether such spacing is substantially equal to the reference signal segment length. Also, the RMS value coincident with each correlation function peak is determined and the pattern of such RMS values coincident with the correlation function peaks is compared with the pattern of the RMS values of the normalized reference signal segments.

25 Claims, 8 Drawing Figures

BROADCAST SIGNAL RECOGNITION SYSTEM AND METHOD

DESCRIPTION

1. Technical Field

The present invention relates to signal recognition systems and methods generally, and more particularly to a system and method for matching a broadcast signal to stored reference signal segments by pattern matching correlation signal peaks and power patterns at said peak points.

2. Background Art

Television and radio stations throughout the country have long been monitored by commercial surveying entities to determine the popularity of certain stations and programs and to verify for advertisers that commercial sale messages are presented at the times prearranged with the broadcast station. Initially, most broadcast surveys were manually conducted and tabulated, thereby requiring the use of a large number of persons to monitor individual broadcast stations and log survey information regarding the programming of the station monitored. The cost of conducting these surveys on a large scale for an extended period proved to be prohibitively high due to the labor intensive nature of the survey. When volunteer surveyors were employed to cut costs, the validity of the data collected often was suspect due to the high probability of error as well as omission resulting from lack of interest on the part of some volunteers.

In recent years, techniques have been developed for electronically monitoring broadcast signals and providing information relative to the content of the programming monitored. Initially, these electronic systems employed a coded signal technique wherein special coded identification segments were inserted in each program to be monitored, and these segments were then broadcast with the audio and/or video program signals. Receiving equipment was then provided which included decoding units designed to decode the broadcast coded segments so that program recognition could be accomplished. Although broadcast coding techniques work effectively for some applications, they do require the allocation of portions of the broadcast signal band for identification purposes, and special processing is required to code and decode the broadcast signal.

To alleviate some of the disadvantages involved with the use of coded signal techniques, completely automatic broadcast signal identification systems have been developed which require no special coding of the broadcast signal. These identification systems employ a comparison technique wherein a single, digitally sampled reference signal segment derived from a portion of the original program content to be identified is compared with successive digitally sampled segments of the corresponding broadcast signal in a correlation process to produce a correlation function signal. The reference signal segment and broadcast signal segments are processed in the same manner before correlation, and during correlation, and if the reference and broadcast signal segments are not the same, a correlation function signal having a relatively small amplitude results. On the other hand, if the segments are the same, a relatively large correlation function signal is produced. The amplitude of the correlation function signal is sensed to provide a recognition signal when the amplitude of the correlation function signal exceeds a selected threshold level. U.S. Pat. No. 3,919,479 to Warren D. Moon et al discloses a broadcast signal identification system of this type which requires no special coding of the broadcast signal.

The known, single reference segment signal identification systems operate effectively in instances where ideal conditions prevail, but for many applications and prevailing operational conditions, these systems are not effective. For example, under intermittent signal dropout, a single segment correlation may be severely degraded, and thereby result in failure to indicate correspondence of the broadcast and reference signals when correspondence does in fact exist.

Finally, with broadcast music programs, the speed variations between the same music selections played by different broadcast stations may be so extreme that even the use of subaudio techniques known to the prior art in a single reference segment system in an attempt to compensate for the effects of such variations are inadequate. The inability of known broadcast signal identification systems to cope effectively with substantial music speed variations is a consequential limitation upon the use of such systems, for a need exists in the music production and distribution industry to monitor the rate of play on radio stations of various recordings to aid in the projection of sales. Since the popularity of a particular recording may be quite different in different parts of the country, it is necessary to perform surveys in many geographical areas. It has been found that disc jockeys, in order to create desired effects, are quite likely to vary recording playback speeds, and this practice is quite prevalent. Disc jockey induced speed variations are likely to cause recognition error in the prior art single reference segment signal recognition systems. Performance of these systems is limited by the fact that requirement for tolerance of speed variations limits the length of single segment reference patterns. This, in turn, limits the amount of information which may be used to recognize a recording and thus degrades recognition performance.

DISCLOSURE OF THE INVENTION

It is a primary object of the present invention to provide a novel broadcast signal recognition system and method wherein signal correlation is provided for a substantial period during a broadcast interval by use of a plurality of reference and broadcast signal segments. This compensates for such disturbances as noise bursts or signal dropout, for with multiple segments, the detection process may be designed to indicate recognition when coincidence occurs between a number of reference and broadcast signal segments which is less than the total number processed.

Another object of the present invention is to provide a novel broadcast signal recognition system and method wherein signal recognition is obtained with a nonlinear correlation process which provides a plurality of correlation peaks. The pattern of these peaks is then matched as well as the pattern produced by the RMS power of a signal segment coincident with the correlation peak of such segment. If matching of the correlation peaks and the power pattern occur within a predetermined time window, then a match has occurred between the broadcast signal and reference segments employed for the recognition process.

A further object of the present invention is to provide a novel broadcast signal recognition system and method wherein more than one sampling rate may occur in the reference signal segments employed in the recognition process. A fast and slow sample may be stored for each reference signal segment so that broadcast signals from faster rate stations will correlate with the faster rate reference segments and signals from slower rate stations will correlate with the slower rate reference segments.

A still further object of the present invention is to provide a novel broadcast signal recognition system and method wherein one or more reference signal segments are taken from a program to be broadcast and are prenormalized before storage. These reference signal segments are processed by normalizing them in accordance with the power in the respective segment and then by Fourier transformation and the performance of a complex conjugate to provide frequency domain complex spectra for storage. The received broadcast signal is prefiltered to select a frequency portion of the audio spectrum that has stable characteristics for discrimination. After further filtering and conversion to a digital signal, the broadcast signal is Fourier transformed and subjected to a complex multiplication process with the reference signal segments to obtain a vector product. The results of the complex multiplication process are then subjected to an inverse Fourier transform step to obtain a correlation function which has been transformed from the frequency to the time domain. This correlation function is now normalized, and the correlation peak for each segment is selected and the peak spacing is compared with segment length. Simultaneously the RMS power of the segment coincident with the segment correlation peak is sensed to determine the segment power point pattern.

These and other objects of the present invention will become apparent from a consideration of the following specification and claims taken in conjunction with the accompanying drawing.

BEST MODE FOR CARRYING OUT THE INVENTION

Effective broadcast signal recognition is extremely difficult to achieve, even under ideal broadcast conditions. The same recorded program broadcast by a plurality of different geographically separated stations is subject to the broadcast conditions peculiar to each individual station as well as to speed variations which may be inherent or purposely induced. Additionally, each broadcast signal may be subject to varying conditions of noise, signal dropout, frequency equalizaiton, dynamic range compression, and other conditions which cause random perturbations in each broadcast signal. Thus, when the recognition process involves the matching of a broadcast signal with a pre-recorded standard reference signal taken from a recorded program before it is broadcast, it will be apparent that the broadcast signal from one station may match differently with the standard reference signal than will the broadcast signal from another station. Consequently, classical correlation comparison techniques employing only a single reference signal segment and a single segment taken from a broadcast signal may not provide accurate data.

The broadcast signal recognition method of the present invention preferably employs a plurality of reference segments taken from a recorded program to be broadcast and a plurality of segments taken from the signal actually broadcast. These reference segments may be taken from separate time periods of a recording or from the same time period but based upon different frequency bands of the same recording. The decision process for recognition of a recording is based upon time delay coincidence of the multiple reference pattern correlation peaks, rather than a single peak of a single correlation function exceeding an amplitude threshold. Because a tolerance for slight time delay shifts between distinct time periods can be built into the coincidence detection, this multiple segment method can be made less vulnerable to playback speed variations than single segment methods which employ the same total recording time period for recognition.

Figure 1:
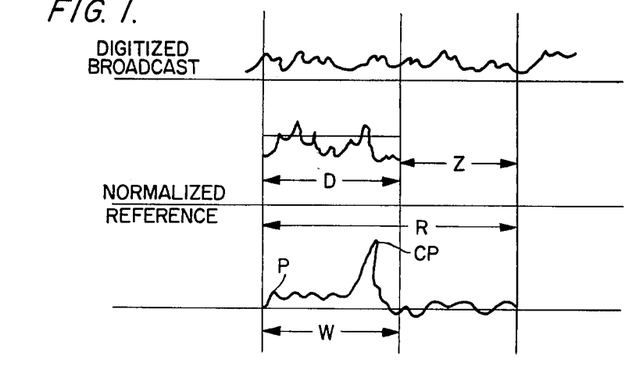
FIG. 1 is a diagram illustrating the processing of a reference and broadcast signal segment in accordance with the present invention.

Turning now in detail to the broadcast signal recognition method of the present invention, a plurality of signal segments of equal length are taken from the recorded program to be broadcast, and after being filtered and digitized, these signal segments are prenormalized to provide normalized reference segments for storage. This prenormalization step involves first scaling each reference segment pattern so that it will have a fixed total power for the segment, and this is accomplished by taking the square root of the total power to obtain the root mean square (RMS) amplitude for the segment. This RMS value is then divided into each point P in the segment to obtain a fixed scale factor K where $K^2$ will be the variance of each segment. Then each normalized reference segment is zero filled to provide a total reference segment having a data section D and a zero filled section z of equal length (FIG. 1). This normalized zero filled reference segment R is then Fourier transformed and the result stored so that the stored reference segments are preprocessed segments which have been normalized in accordance with the power in the segment, transformed into a frequency domain and then transformed by the performance of a complex conjugate to provide frequency domain complex spectra.

To compare the stored reference segments with a broadcast signal, the broadcast signal is first received and prefiltered to select a frequency portion of the audio spectrum that has stable characteristics. Since the high and low frequency portions of the audio spectrum are normally unstable, this prefiltering step generally results in providing an envelope in an intermediate stable frequency region. Onne the envelope is formed, it is again filtered to obtain a good stable narrow bandwidth signal which is then digitized and Fourier transformed to obtain a frequency domain, complex spectrum. Sequential subsegments of this signal, which are equal in length to the zero filled reference signal segments R, are then complex multiplied with the reference signal segments to obtain a vector product which is then subjected to an inverse Fourier transform to obtain a time domain correlation function which has not been normalized to the input power of the broadcast signal. This unnormalized time domain correlation function is then sequentially normalized by a sliding RMS process within a window W having the same length as each data section D. For each point P in the correlation function, the RMS of the total digitized broadcast signal within the window is calculated and divided into each point P in the correlation function within the window to obtain a normalized segment having a correlation peak CP. The temporal spacing between these correlation peaks is detected and, if such spacing is substantially equal to the length of the reference segments R, then signal recognition is indicated.

Generally, a double detection process to insure program recognition is desirable, and to accomplish this, power pattern recognition may be accomplished simultaneously with correlation peak pattern detection. This involves detecting the RMS power of the segment within the window W coincident with the correlation peak and comparing the resultant power pattern resulting from the matched segments. When both the correlation peak spacings and power patterns match, a recognition signal is generated.

Figure 2:
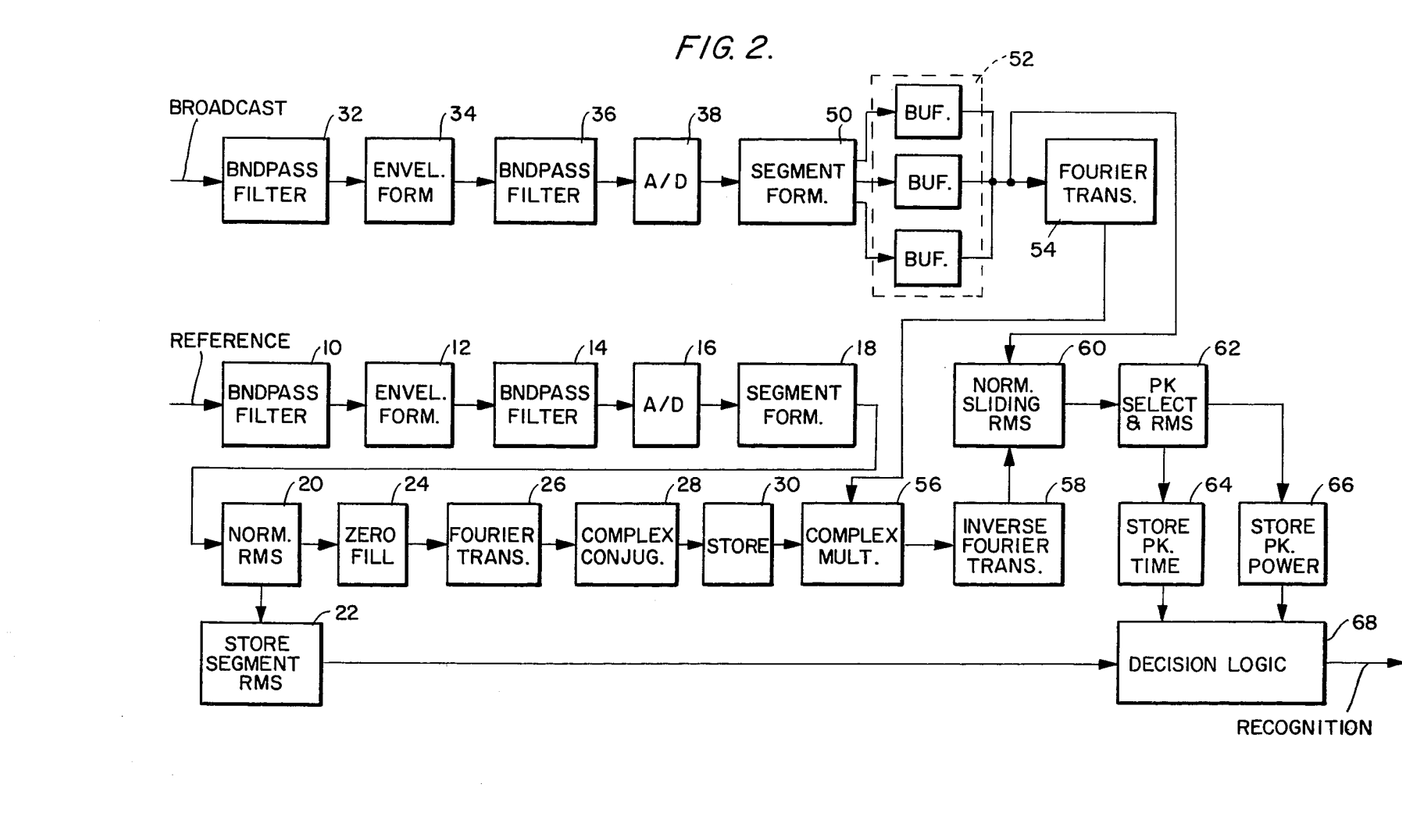
FIG. 2 is a block diagram of a system illustrating the steps of the present invention.
Figure 3:
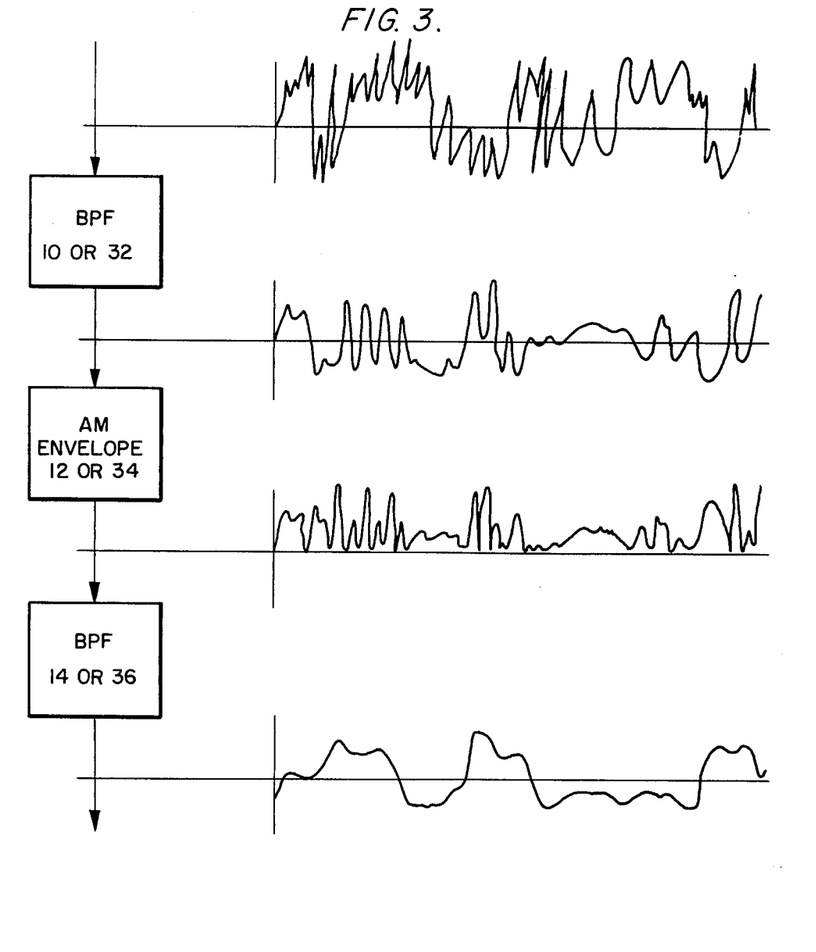
FIG. 3 is a block diagram of the envelope forming section of the system of FIG. 2 showing the waveforms present at each point in the section.
Figure 4:
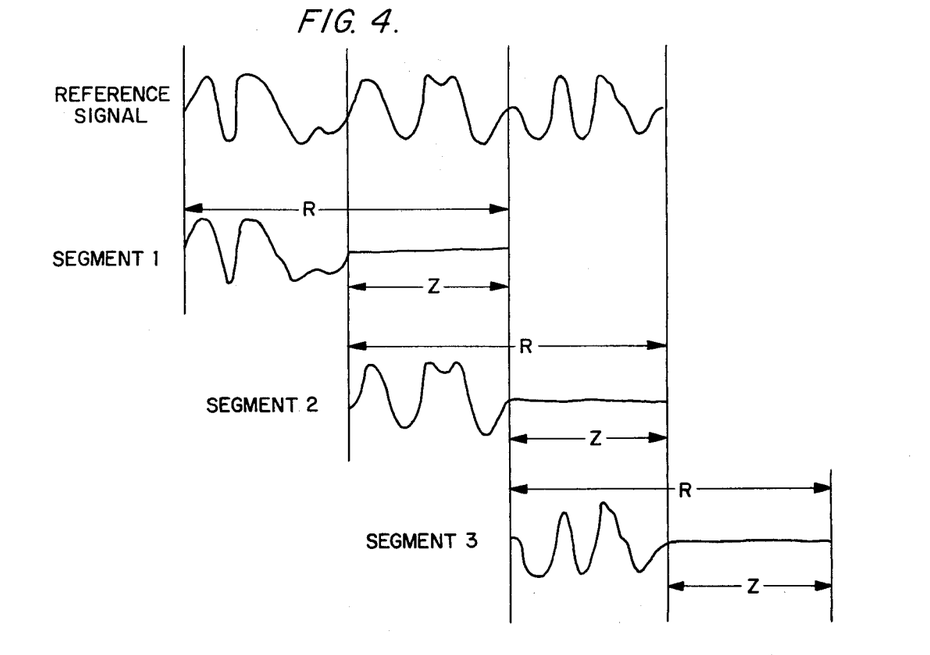
FIG. 4 is a diagram showing the reference signal segments created by the normalizing and zero fill sections of FIG. 2.

The block diagram system of FIG. 2 taken with the block diagrams and waveforms of FIGS. 3-8, provides a diagrammatic representation of the basic steps involved in the broadcast signal recognition method of the present invention. With reference to FIGS. 2 thru 8, it will be noted that a reference signal from a prerecorded program to be broadcast is first prefiltered by a bandpass filter 10 to select a frequency portion of the audio spectrum having a stable amplitude envelope characteristics. The output from the filter 10 is passed to an envelope forming section 12 which provides an envelope waveform to a bandpass filter 14. The output from the filter 14 is a narrow bandwidth signal which is then digitized in an analog to digital converter 16 and divided into a plurality of equal length reference segments in a segmenting section 18. These reference segments are then prenormalized segment by segment in a normalization section 20 to obtain a RMS amplitude for each reference segment. This is a conventional normalization process where the square root of the power of each segment is obtained to provide the RMS amplitude for the segment. The RMS amplitude for each segment is then separately stored in a storage section 22, while the normalized reference segments are then zero filled in section 24 to form the complete reference segments R (FIG. 4). Each reference segment R is then Fourier transformed at 26 and the result transformed by the performance of a complex conjugate at 28 to provide frequency domain complex spectra for each of the reference segments R which are separately stored at 30. These stored reference segments can then be provided at various locations for comparison with a broadcast signal at that location.

The broadcast signal at a location is received and prefiltered in a bandpass filter 32, formed into an envelope by an envelope forming section 34, and again filtered by a bandpass filter 36 to provide a narrow bandwidth signal which is digitized by an analog to digital converter 38. The bandpass filter 32, envelope forming section 34, bandpass filter 36 and analog to digital converter 38 are identical in structure and function to the bandpass filter 10, the envelope forming section 12, the bandpass filter 14 and the analog to digital converter 16 for the reference signal.

Figure 5:
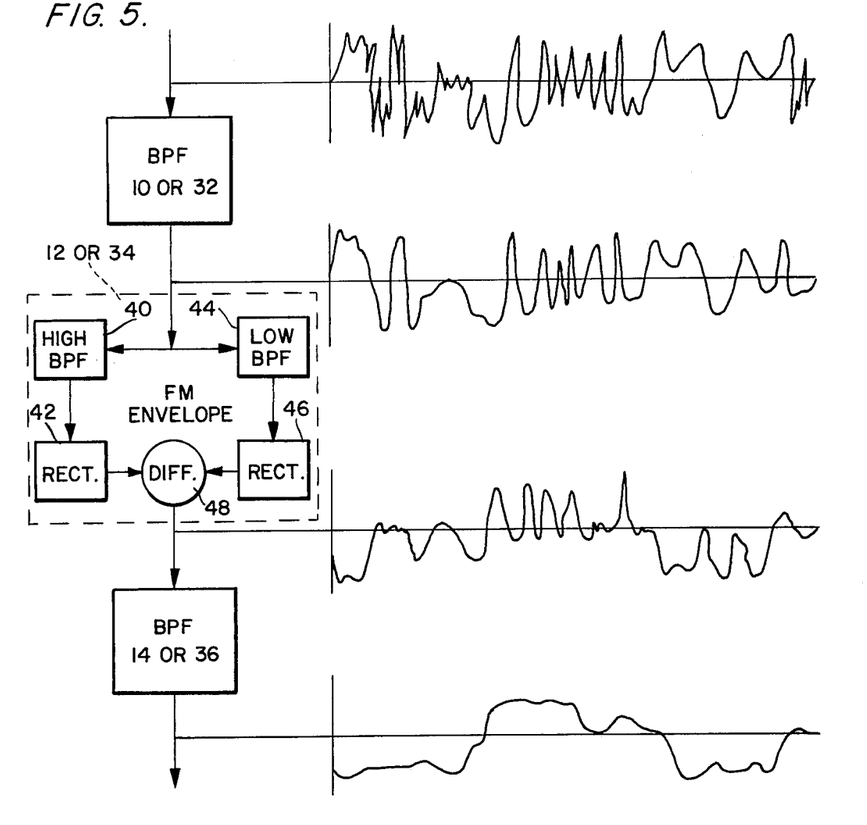
FIG. 5 is a block diagram of a second embodiment of the envelope forming section of the system of FIG. 2 showing the waveforms present at each point in the section.

It should be noted that the bandpass filters 10, 14, 32 and 36 and the envelope formers 12 and 34 may be designed to provide an AM signal to be digitized as illustrated in FIG. 3 or an FM signal as illustrated in FIG. 5. The previously identified Moon patent discloses various filter and envelope forming units to provide an AM signal. To similarly operate with an FM signal, the bandpass filters 10 and 32 pass a filtered FM signal to an FM envelope former 12 or 34. This FM envelope former includes two channels to receive the input signal. A first channel includes a high bandpass filter 40 and a rectifier 42 while the second channel includes a low bandpass filter 44 and a rectifier 46. The outputs from the rectifiers 42 and 46 are directed to a differencing circuit 48, and the resulting difference signal from these two outputs is then directed to the bandpass filter 14 or 36.

Figure 6:
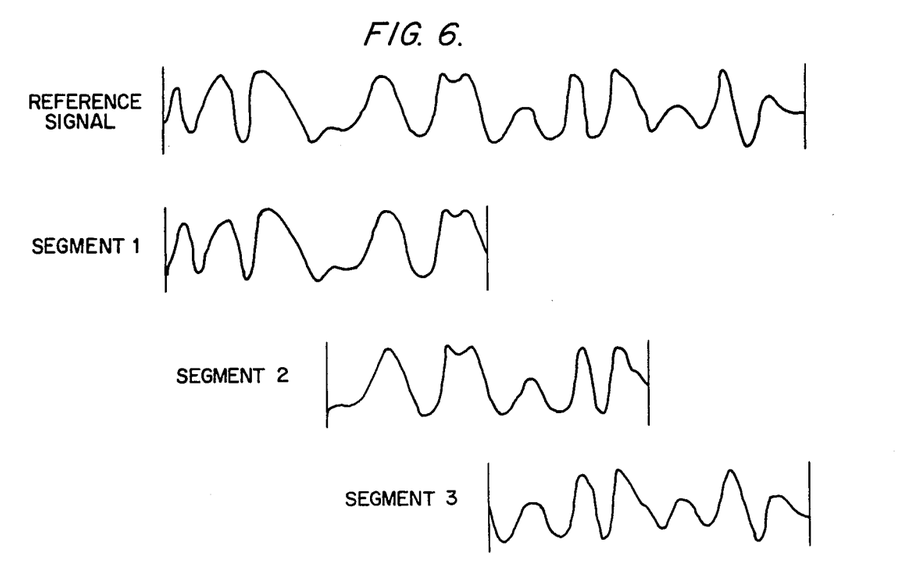
FIG. 6 is a diagram showing the broadcast signal segments output from the buffer section of FIG. 2.

The digitized broadcast signal from the analog to digital converter 38 is divided into several broadcast signal segments in a segment former 50. These segments are overlapped in a form overlap buffer section 52 so that although each broadcast signal segment is equal in length to a zero filled reference segment R, the segments taken from the buffer 52 are overlapped for a half segment length as illustrated in FIG. 6. Three reference signal segments for comparision with successive groups of three broadcast signal segments have been shown for purposes of illustration in FIGS. 4 and 6, but other plural numbers of reference signal segments may be used.

The broadcast signal segments from the buffer 52 are provided from the buffer for use later in a sliding RMS window section and are also individually converted to a frequency domain, complex spectrum in the Fourier transform section 54, but the output from this section, unlike the reference signal segments stored in section 30, is not normalized. This output is subjected to a complex multiplication function in the multiplier section 56 where the stored reference segments from the storage unit 30 are multiplied with the output from the Fourier transform section 54 to obtain a vector product or cross power spectra for each segment. Then all segments are inverse Fourier transformed in section 58 to obtain a correlation which is then normalized by passing through a sliding RMS window in section 60.

Figure 7:
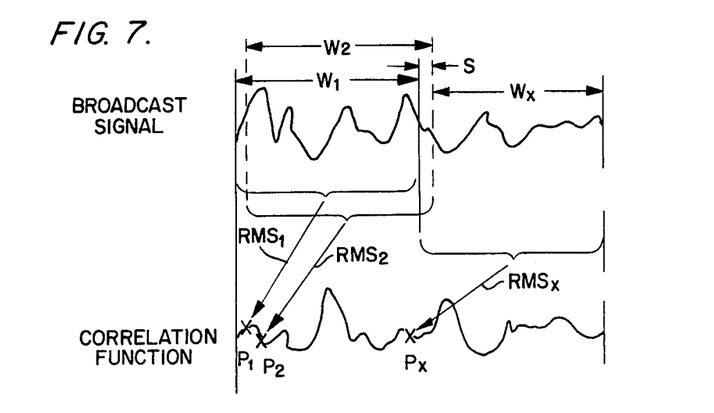
FIG. 7 is a diagram illustrating the operation of the normalizing and sliding RMS section of FIG. 2.

As previously discussed, the window W provided in section 60 is equal in length to a data section D, and a new RMS is calculated for the signal portion within this window each time a new data point enters the window. To achieve this sliding RMS value, the digitized broadcast signal from the form overlap buffer section 52 is employed with a sliding window W having a length equal to the data section R. As illustrated in FIG. 7, the RMS value of the broadcast signal within the window W1 is obtained and this RMS value is divided into the corresponding value of the correlation function P1 from the Fourier transform section 58 to obtain a normalized cross corrlation value. Then relative movement between the window W and the broadcast signal occurs for the distance S of one data space which is equal to moving over one point in the correlation function as illustrated in FIG. 7. This provides the window W2, and the RMS value of the digitized broadcast signal within this window is calculated and divided into the correlation function P2 to obtain a cross correlation value. Relative motion between the window and the broadcast signal continues in one data space steps with a cross correlation value being obtained during each step until the window reaches the Wx position. At this point, a correlation peak will have been established for segment 1 (FIG. 6), and the process is repeated with segments 2, 3 and X.

The correlation peak in each cross correlation function segment from section 60 is selected in a detection section 62 and the position (i.e. time of occurrence) of the correlation peak in each segment is stored in a storage section 64. Also in section 62, the RMS value coincident with each correlation peak is calculated and stored in a storage section 66. When the storage sections 64 and 66 contain information from a plurality of segments equal in number to the number of reference segments, a decision logic section 68 can determine if a reference and broadcast signal match exists.

Figure 8:
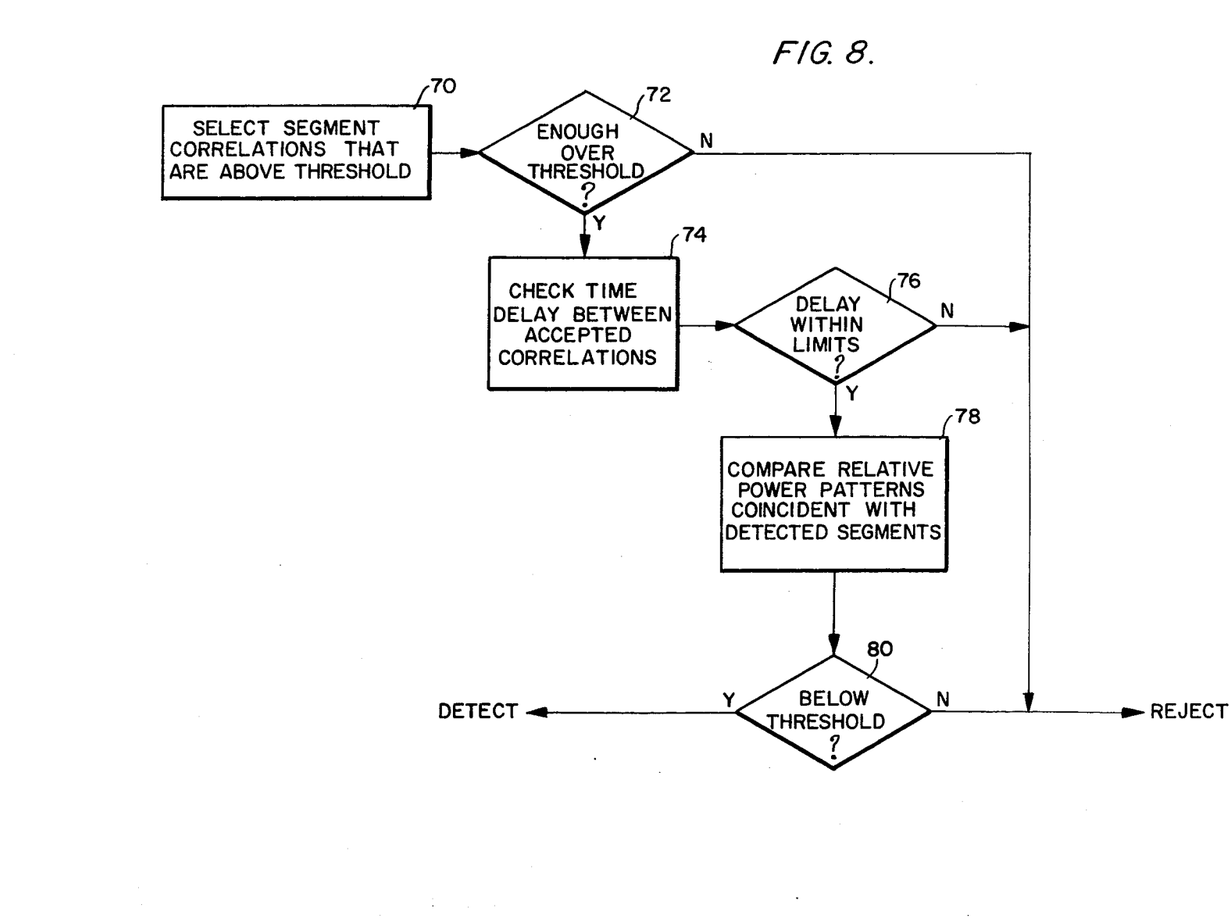
FIG. 8 is a flow diagram illustrating the operation of the decision logic of FIG. 2.

The decision logic section 68 operates in accordance with the flow chart of FIG. 8 and as indicated at 70, a plurality of correlation peaks which exceed a predetermined threshold are selected for consideration. A decision is made at 72 to determine whether a sufficient number of correlation peaks has been selected for consideration. As previously indicated, the decision logic can make a comparison based upon a number of signal and reference segments which is less than the total number of reference segments stored. For example, if five reference segments were stored initially, section 72 may permit a comparison to continue based upon three or four acceptable correlation peaks. If the comparison is to continue, section 74 checks the time delay between accepted correlation peaks, and if the time delay or spacing between a succession of peaks is substantially equal to the length of a reference segment R, a signal match may exist. This is determined by a delay decision section 76, which is set to permit a certain amount of spacing error, thereby permitting an allowable amount of speed variation in the broadcast signal. Also, the delay decision section may permit more than the allowable spacing variation between a minority of the correlation peaks sensed. For example, where five reference segments R are employed, the delay decision section may indicate signal recognition when three out of five successive peaks are properly spaced. This will permit the system to operate effectively in the presence of noise bursts, signal dropout, and similar adverse conditions which impair the effectiveness of conventional signal recognition systems.

Although signal recognition can be indicated at this point, the accuracy of the system is greatly enhanced if an additional comparison of power patterns is required before a recognition signal is provided. It will be noted in FIG. 2 that the stored reference segment RMS values are provided by the storage section 22 to the decision logic 68. The power pattern formed by the reference segment RMS values is compared by a decision logic section 78 with the power pattern formed by the RMS value coincident with each correlation peak which is stored in the storage section 66. For example, if the RMS value of the first stored reference segment is twice that of the second reference segment and three times that of the third reference segment, the same relationship should be found in the values provided by the storage section 66. If these power patterns are found to be coincident, a decision section 70 indicates that signal recognition has occurred.

INDUSTRIAL APPLICABILITY

The broadcast signal recognition method may be employed effectively to provide automatic recognition of broadcast recordings, including music and advertisements. A system employing this method can be deployed in a network over a large geographic area to permit surveys to be conducted in real time. This network is capable of operating continuously with a high degree of accuracy, and many channels may be monitored simultaneously for a large number of recordings. The method incorporates techniques which compensate for speed variations, spectral alteration and amplitude compression, and these techniques render the identification process relatively insensitive to the characteristics of various broadcast stations. Also, the method is highly versatile and readily adaptable for use where a variety of variable conditions prevail. For example: the speed of the reference signals may be varied to compensate for extreme speed variations in the broadcast signal. To accomplish this, a plurality, for example three, of reference signals may be provided at normal speed, three reference signals may be increased above normal speed and stored, and three reference signals may be decreased in speed below normal and stored. The broadcast signal is then compared against all of these reference signals and a match will be obtained with the three closest to the broadcast signal speed.

We claim:

1. A method for the automatic electronic recognition of a program unit broadcast by radio waves which includes:
   a. processing said program unit to obtain a plurality of digitized reference signal segments;
   b. successively processing a broadcast signal to generate successive digitized broadcast signal segments;
   c. correlating a plurality of successive digitized broadcast signal segments with an equal number of digitized reference signal segments to obtain correlation function peaks for each resultant correlation segment, and
   d. comparing the spacing between correlation function peaks for each correlation segment to determine whether such spacing is substantially equal to the reference signal segment length.

2. The method of claim 1 which includes obtaining the RMS power value of each reference signal segment, obtaining an RMS power value coincident with each correlation function peak, comparing the pattern of the RMS power values from said reference signal segments with the pattern of the RMS power values coincident with an equal number of said correlation function peaks.

3. The method of claim 1 which includes providing a recognition signal when the spacing between said correlation function peaks is within a predetermined limit.

4. The method of claim 3 which includes providing a recognition signal when the number of spaces between said correlation function peaks which fall within said predetermined limit is more than one half the number of said reference segments.

5. The method of claim 2 which includes providing a recognition signal when the spacing between said correlation peaks is within a predetermined limit and the pattern of the RMS power values coincident with said correlation function peaks matches within predetermined limits the pattern of the RMS power values from said reference signal segments.

6. A method for the automatic electronic recognition of a program unit broadcast by radio waves which includes:
a. processing said program unit to obtain a plurality of digitized reference signal segments, the processing of said program unit including prefiltering to select a preferred signal in a frequency portion of the audio spectrum with a stable characteristic, forming an envelope from said prefiltered signal to provide an envelope reference signal, filtering the envelope reference signal to obtain a stable, narrow bandwidth reference signal, and digitizing said narrow bandwidth reference signal to obtain a digitized reference signal,
b. successively processing a broadcast signal to generate successive digitized broadcast signal segments, the processing of said broadcast signal including prefiltering to select a prefiltered broadcast signal in a frequency portion of the audio spectrum with a stable characteristic, forming an envelope from said prefiltered broadcast signal to provide an envelope broadcast signal, filtering the envelope broadcast signal to obtain a stable, narrow bandwidth broadcast signal and digitizing said narrow bandwidth broadcast signal to obtain a digitized broadcast signal,
c. correlating a plurality of successive digitized broadcast signal segments with an equal number of digitized reference signal segments to obtain correlation function peaks for each resultant correlation segment, and
d. comparing the spacing between correlation function peaks for each correlation segment to determine whether such spacing is substantially equal to the reference signal segment length.

7. The method of claim 6 which includes normalizing said digitized reference signal to obtain a normalized reference signal before correlation with said broadcast signal segments.

8. The method of claim 7 which includes storing said normalized reference signal and said digitized broadcast signal before correlation.

9. The method of claim 1 which includes dividing said reference signal into a plurality of reference segments of equal length to obtain a plurality of digitized reference segments, normalizing said digitized reference segments to obtain the RMS power value for each reference segment, and storing each such normalized reference segment.

10. A method for the automatic electronic recognition of a program unit broadcast by radio waves which includes:
a. processing said program unit to obtain a plurality of digitized reference signal segments by digitizing and dividing said reference signal into a plurality of reference segments of equal length to obtain a plurality of digitized reference segments, normalizing said digitized reference segments to obtain the RMS power value for each reference segment, and storing each such RMS power value for each reference segment, zero filling each such normalized reference segment to obtain a plurality of zero filled reference segments of equal length, successively subjecting each said zero filled reference segment to a Fourier transformation and the performance of a complex conjugate to obtain a frequency domain complex spectra for each such zero filled reference segment, and storing the resultant frequency domain complex spectra reference signal segments;
b. successively processing a broadcast signal to generate successive digitized broadcast signal segments;
c. correlating a plurality of successive digitized broadcast signal segments with an equal number of digitized reference signal segments to obtain correlation function peaks for each resultant correlation segment, and
d. comparing the spacing between correlation function peaks for each correlation segment to determine whether such spacing is substantially equal to the reference signal segment length.

11. The method of claim 10 which includes successively dividing said broadcast signal into a plurality of broadcast signal segments equal in length to said zero filled reference segments and storing said digitized broadcast signal segments.

12. The method of claim 11 which includes successively subjecting said stored digitized broadcast signal segments to Fourier transformation to obtain frequency domain, complex spectra broadcast signal segments, multiplying the complex spectra broadcast signal segments with the stored frequency domain complex spectra reference signal segments to obtain cross power spectra segments, subjecting said cross power spectra segments to inverse Fourier transformation to obtain correlation function segments, and obtaining normalized correlation function segments by successively obtaining an RMS power value for each of a plurality of equal length, overlapped sections within each digitized broadcast signal segment, each such equal length section being equal in length to one half the length of the broadcast signal segment and the leading and trailing edge of each equal length section within a digitized broadcast signal segment being offset from the leading and trailing edge of the subsequent equal length section by one data space in said correlation function segment, the RMS value obtained from each equal length section being divided into a corresponding point in said correlation function segment to provide a normalized correlation function segment having a correlation function peak.

13. The method of claim 12 which includes obtaining an RMS power value coincident with each of said correlation function peaks, comparing the pattern of the stored RMS power values from said reference signal segments with the pattern of the RMS power values coincident with an equal number of said correlation function peaks.

14. The method of claim 13 which includes providing a recognition signal when the spacing between said correlation function peaks is within a predetermined limit and the pattern of the RMS power values coincident with said correlation function peaks matches within predetermined limits the pattern of the RMS power values from said digitized reference signal segments.

15. A method for the automatic electronic recognition of a program unit broadcast by radio waves which includes:
a. processing said program unit to obtain a plurality of digitized reference signal segments including at least two groups of successive digitized reference signal segments, the speed of one of said groups being varied with relation to the speed of the remaining group,
b. successively processing a broadcast signal to generate successive digitized broadcast signal segments;

c. correlating a plurality of successive digitized broadcast signal segments with an equal number of digitized reference signal segments to obtain correlation function peaks for each resultant correlation segment, and d. comparing the spacing between correlation function peaks for each correlation segment to determine whether such spacing is substantially equal to the reference signal segment length.

16. The method of claim 15 which includes correlating said plurality of broadcast signal segments with the groups of reference signal segments.

17. The method of claim 6 wherein the processing of said program unit includes forming an FM envelope from said prefiltered signal which is a function of the frequency content of said prefiltered signal, and the processing of said broadcast signal includes forming an FM envelope from said prefiltered signal which is a function of the frequency content of the prefiltered signal.

18. A method for the automatic, electronic recognition of a program unit broadcast by radio waves which includes:

a. obtaining a plurality of reference signal segments from said program unit;

b. processing said plurality of reference signal segments to obtain digitized reference signal segments;

c. obtaining the RMS power value of each reference signal segment;

d. successively processing a broadcast signal to generate successive digitally sampled broadcast signal segments;

e. correlating a plurality of successive broadcast signal segments with an equal number of digitized reference signal segments to obtain correlation function peaks for each resultant correlation segment;

f. obtaining an RMS power value coincident with each correlation function peak, and g. comparing the pattern of the RMS power values from said reference signal segments with the pattern of the RMS power values coincident with an equal number of said correlation function peaks.

19. The method of claim 18 which includes providing a recognition signal when the RMS power value coincident with said correlation function peaks matches within predetermined limits the pattern of RMS power values from said reference signal segments.

20. The method of claim 6 which includes obtaining the RMS power value of each reference signal segment, obtaining an RMS power value coincident with each correlation function peak, comparing the pattern of the RMS power values from said reference signal segments with the pattern of the RMS power values coincident with an equal number of said correlation function peaks.

21. The method of claim 6 which includes providing a recognition signal when the spacing between said correlation function peaks is within a predetermined limit.

22. The method of claim 21 which includes providing a recognition signal when the number of spaced between said correlation function peaks which fall within said predetermined limit is more than one half the number of said reference segments.

23. The method of claim 20 which includes providing a recognition signal when the spacing between said correlation peaks is within a predetermined limit and the pattern of the RMS power values coincident with said correlation function peaks matches within predetermined limits the pattern of the RMS power values from said reference signal segments.

24. The method of claim 18 which includes comparing the spacing between correlation function peaks for each correlation segment to determine whether such spacing is substantially equal to the reference signal segment length.

25. The method of claim 24 which includes providing a recognition signal when the spacing between said correlation peaks is within a predetermined limit and the pattern of the RMS power values coincident with said correlation function peaks matches within predetermined limits the pattern of the RMS power values from said reference signal segments.

* * * * *